(No Model.)
W. HOEN.
SELF LUBRICATING TROLLEY.
No. 460,232. Patented Sept. 29, 1891.
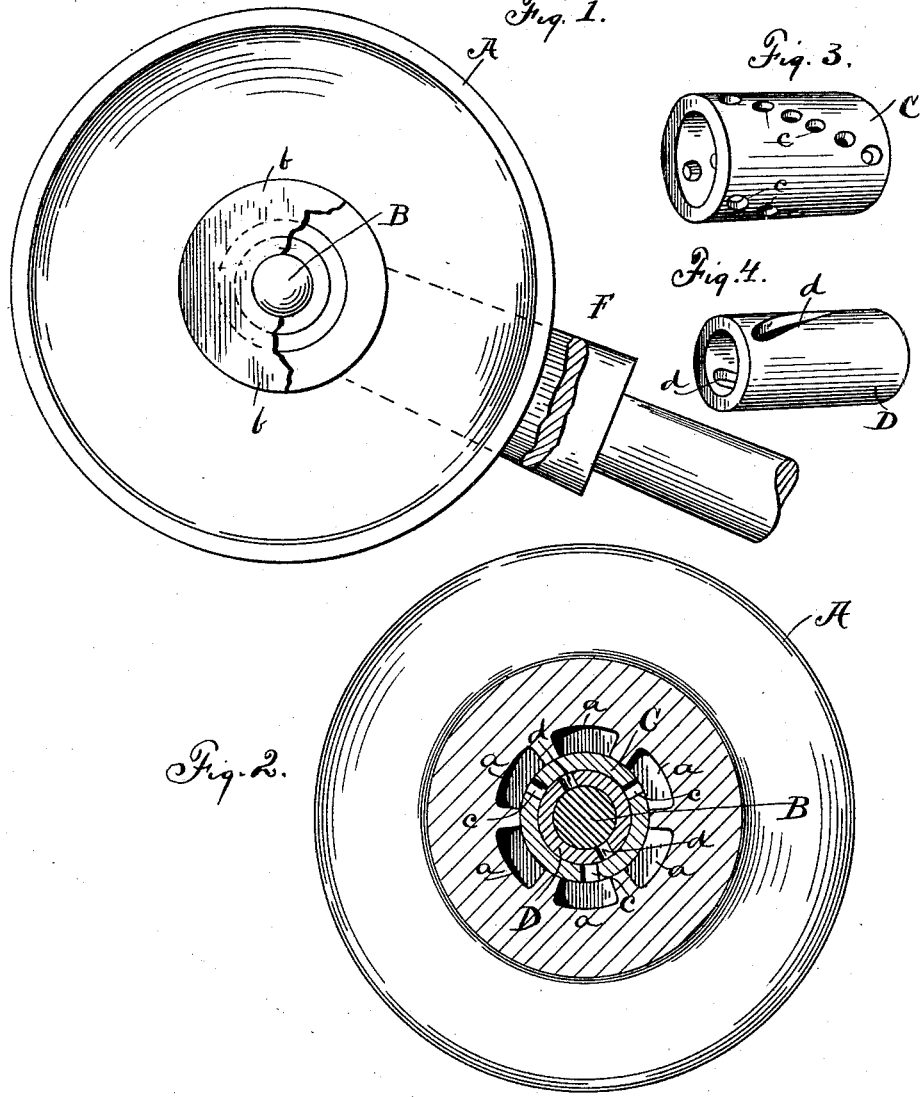
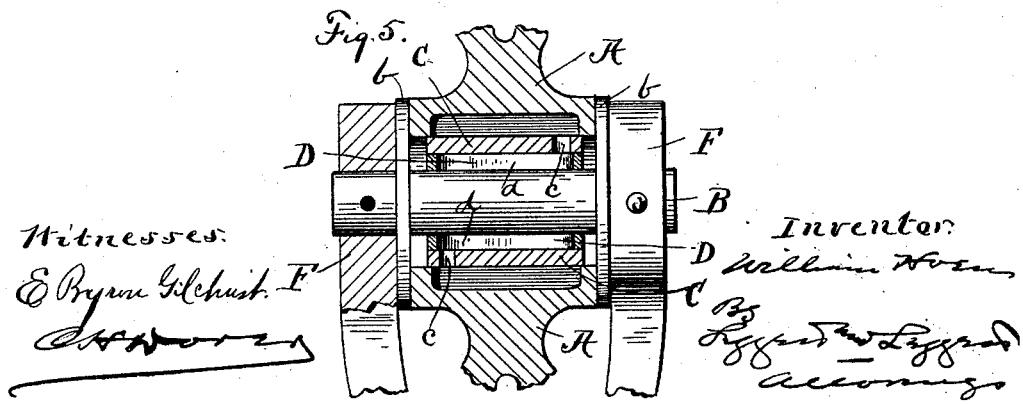
Witnesses:
Inventor:
William Hoen

UNITED STATES PATENT OFFICE.

WILLIAM HOEN, OF CLEVELAND, OHIO.

SELF-LUBRICATING TROLLEY.

SPECIFICATION forming part of Letters Patent No. 460,232, dated September 29, 1891.

Application filed April 13, 1891. Serial No. 388,796. (No model.)

*To all whom it may concern:*

Be it known that I, WILLIAM HOEN, of Cleveland, in the county of Cuyahoga and State of Ohio, have invented certain new and useful Improvements in a Self-Lubricating Trolley; and I do hereby declare the following to be a full, clear, and exact description of the invention, such as will enable others skilled in the art to which it pertains to make and use the same.

My invention relates to improvements in a self-lubricating trolley designed more especially for trolley-wheels for electric street-cars, but well adapted for loose pulleys generally; and it consists in certain features of contruction and in combination of parts hereinafter described, and pointed out in the claims.

Heretofore the trolley-wheels on the electric street-cars have been the source of much trouble and expense from the fact that the journal-bearings thereof required frequent oiling, usually once in about two hours, and that the greater part of the oil thus used was thrown off by centrifugal force and wasted, and notwithstanding such frequent care the trolley-wheels frequently became "stuck" and flattened by sliding contact with the wire, thereby rendering such wheels unfit for use until repaired, and such repairs were so frequent that the trolley-wheel was short-lived. In view of the foregoing I have devised the improvements illustrated in the accompanying drawings.

Figure 1 is an end elevation of a trolley-wheel embodying my invention, the one prong of the trolley-pole being broken away. Fig. 2 is an elevation in central section of the trolley-wheel and my improved bushings in place. Fig. 3 is a perspective view in detail of the outer bushing C detached. Fig. 4 is a perspective view of the inner bushing D detached. Fig. 5 is a plan, partly in section, showing more especially the location of washers $b\ b$.

A represents the trolley-wheel; B, the axial pin of the wheel, this pin being mounted on and rigidly secured to the prong F of the trolley pole or lever. A series of internal chambers $a$ are cored in the hub of wheel A, these chambers opening into the central bore of the wheel. Fitting nicely, but easily, inside this bore is a bushing C, having numerous small radial holes $c$, preferably arranged in three series or rows located on different sides of the bushing, each row of holes extending lengthwise, but winding more or less spirally around the bushing in the same direction. Inside the outer bushing C is located an inner bushing D, this bushing having an easy fit inside the outer bushing and having an easy fit on pin B aforesaid. Bushing D has two slots $d\ d$ located on opposite sides of the bushing, and extending lengthwise and winding somewhat spirally around the bushing in the same direction, but the spiral trend of slots $d\ d$ leading in the opposite direction to that of the spiral lead of the rows of holes $c$ of the outer bushing.

Pin B and the outer bushing C are usually of steel, and the inner bushing D and wheel A are usually of brass or bronze, although other anti-friction metal may be employed for these members. Chambers $a\ a$ are packed with solid lubricant, known as "dope" or "grease." The dope from chambers $a$ finds its way in and through holes $c$ in the form of small teats, and the ends of these teats are sheared off by the side walls of slots $d\ d$, so that the dope slowly accumulates in these slots, whereby the bearing-surfaces between pin B and bushing D are kept lubricated, as are also the bearing surfaces between the two bushings, the engaging surfaces between the outer bushing and wheel A being lubricated in the first instance as the dope is discharged from chambers $a$. There are two washers $b\ b$, usually of leather, fitting snugly on pin B and bearing against the hub of wheel A. These bushings prevent the lubricant from wasting, and also distribute the lubricant to the end bearings of the wheel and bushing. The trolley-wheel, that usually revolves at a high rate of speed, turns on the outer bushing, that is likely to revolve about two-thirds as fast as the wheel, and this in turn is revolved on the inner bushing, that is also supposed to be in motion, so that the speed of the different bearing-surfaces is greatly reduced, and if any two surfaces rub or chafe, so that they turn harder, the other surfaces that are more properly lubricated will do the greater part of the work, and thus the different parts aid each other and the result is most satisfactory.

I have reduced my invention to practice, and by supplying chambers $a$ with dope once a month find no difficulty whatever with the trolley-wheel. As a matter of fact, I will state that in one instance the trolley-wheel was allowed to run eleven weeks without renewing the dope, and at the end of the time the parts were found in perfect order, although this particular trolley-wheel during the eleven weeks had been in daily use the same as other trolley-wheels that required oiling once in two hours.

What I claim is—

1. A journal-bearing for a trolley-wheel or loose pulley, comprising an axial pin or shaft and an inner and outer bushing intermediate between the pulley or wheel and the axial pin or shaft, the outer bushing having numerous small holes distributed over the surface and extending radially through this bushing, the inner bushing having one or more slots extending lengthwise and winding more or less spirally around the bushing, the wheel having internal chambers for receiving dope, these chambers opening into the central bore of the pulley, substantially as set forth.

2. A trolley-wheel or loose pulley having a central bore and series of internal chambers opening into such bore, the wheel having a loose bushing mounted on an inner bushing, the latter being mounted loose on the axial pin or shaft, the outer bushing having numerous radial small holes preferably arranged in three rows, the different rows of holes extending lengthwise of the bushing and winding more or less spirally, the inner bushing having longitudinal slots winding spirally in different directions to that of the spiral trend of the holes of the outer bushing, substantially as set forth.

In testimony whereof I sign this specification, in the presence of two witnesses, this 21st day of March, 1891.

WILLIAM HOEN.

Witnesses:
C. H. DORER,
WARD HOOVER.